(12) United States Patent
Bowe et al.

(10) Patent No.: US 8,444,939 B2
(45) Date of Patent: May 21, 2013

(54) CATALYTIC REACTOR

(75) Inventors: Michael Joseph Bowe, Lancashire (GB);
Clive Derek Lee-Tuffnell, Dorset (GB)

(73) Assignee: CompactGTL plc, Abingdon Oxfordshire (GB)

( * ) Notice: Subject to any disclaimer, the term of this patent is extended or adjusted under 35 U.S.C. 154(b) by 246 days.

(21) Appl. No.: 12/810,128

(22) PCT Filed: Sep. 24, 2008

(86) PCT No.: PCT/GB2008/050855
§ 371 (c)(1),
(2), (4) Date: Sep. 2, 2010

(87) PCT Pub. No.: WO2009/081175
PCT Pub. Date: Jul. 2, 2009

(65) Prior Publication Data
US 2010/0324158 A1 Dec. 23, 2010

(30) Foreign Application Priority Data
Dec. 24, 2007 (GB) .................................. 0725140.8

(51) Int. Cl.
*B01J 8/02* (2006.01)
*C07C 27/06* (2006.01)

(52) U.S. Cl.
USPC ........... 422/601; 422/602; 422/198; 422/211; 422/222; 518/706; 518/712

(58) Field of Classification Search
USPC .......... 422/601, 602, 198, 211, 222; 518/706, 518/712
See application file for complete search history.

(56) References Cited

U.S. PATENT DOCUMENTS

| 3,528,783 A * | 9/1970 | Haselden ...................... 422/638 |
| 2004/0258587 A1 | 12/2004 | Bowe et al. |
| 2005/0282918 A1* | 12/2005 | Bowe ........................... 518/726 |
| 2007/0258883 A1 | 11/2007 | West et al. |

FOREIGN PATENT DOCUMENTS

| GB | 2223237 A * | 4/1990 |
| WO | WO 03/048034 | 6/2003 |
| WO | WO 2006/079848 | 8/2006 |
| WO | WO 2006/095204 | 9/2006 |

OTHER PUBLICATIONS

International Search Report and Written Opinion for PCT/GB2008/050855 dated Dec. 11, 2008.

* cited by examiner

*Primary Examiner* — Jennifer A Leung
(74) *Attorney, Agent, or Firm* — McDermott Will & Emery LLP

(57) ABSTRACT

A reactor module for Fischer-Tropsch synthesis having a generally rectangular reactor block with a stack of plates defining flow channels for coolant and flow channels for the synthesis reaction arranged alternately in the block. The synthesis flow channels extend in a generally vertical direction between upper and lower faces of the reactor block and are defined by plates in combination with either bars or sheets such that each channel is of width no more than 200 mm. The coolant flow channels are oriented in the same direction, and communicate through distributor chambers with inlet and outlet ports at side faces of the reactor block. A plant may contain a multiplicity of such reactor modules operating in parallel, the modules being interchangeable and replaceable. The temperature control is enhanced by allowing the coolant flow to be parallel to the synthesis gas flow.

17 Claims, 3 Drawing Sheets

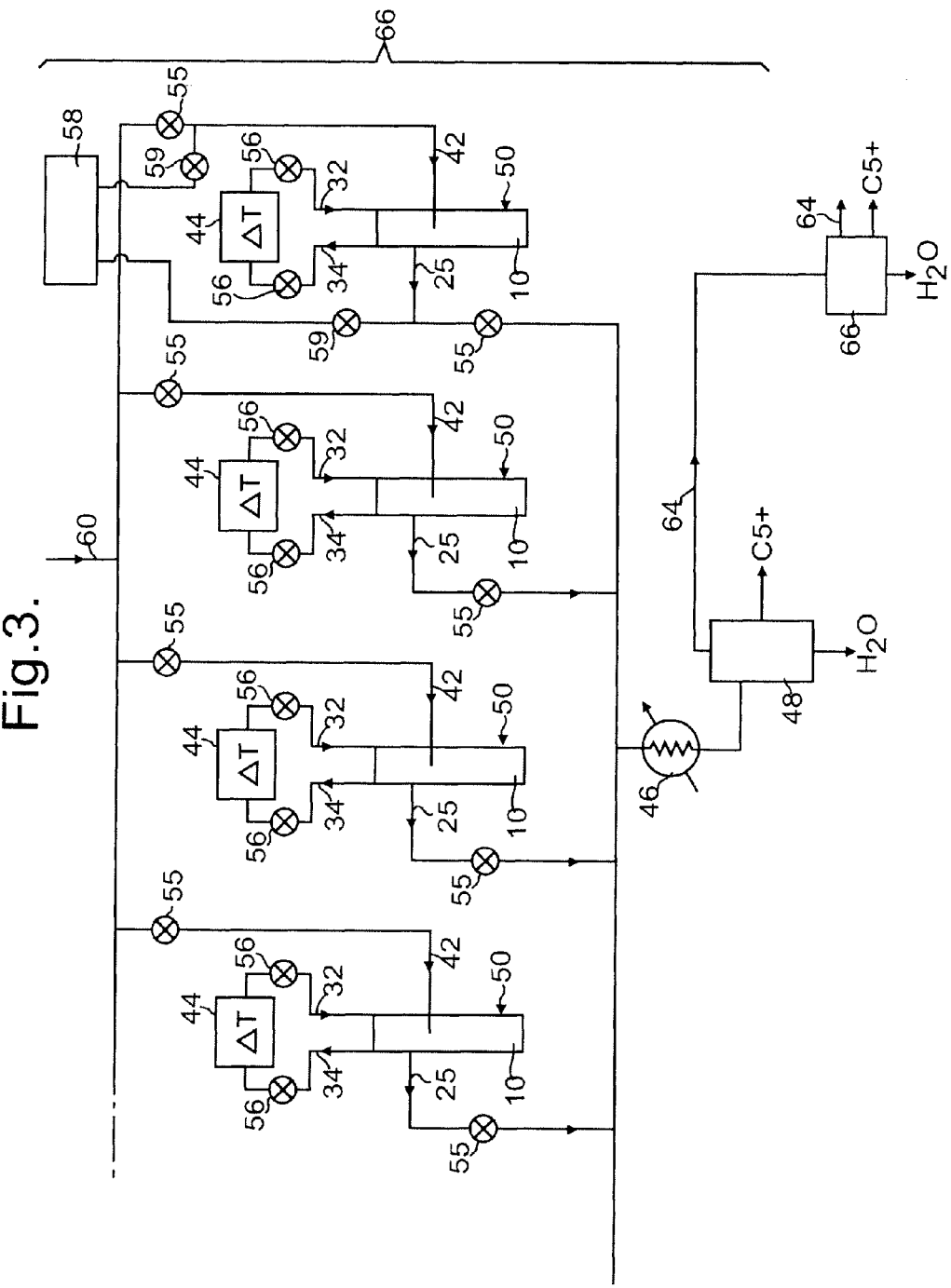

CATALYTIC REACTOR

This invention relates to a catalytic reactor suitable for use in a chemical process to convert natural gas to longer-chain hydrocarbons, in particular for performing Fischer-Tropsch synthesis, and to a plant including such a catalytic reactor to perform the process.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid under ambient conditions. The two stages of the process, steam/methane reforming and Fischer-Tropsch synthesis, require different catalysts, and heat to be transferred to or from the reacting gases, respectively, as the reactions are respectively endothermic and exothermic. The reactors for the two different stages must comply with somewhat different requirements: Fischer-Tropsch synthesis is usually carried out at a higher pressure but a lower temperature than steam/methane reforming; and in the heat transfer channels of the Fischer-Tropsch reactor only a coolant fluid is required, whereas the heat required for steam/methane reforming would typically be provided by catalytic combustion, and so would require a suitable catalyst.

In each case the reactor is preferably formed as a stack of plates, with flow channels defined between the plates, the flow channels for the different fluids alternating in the stack. In those channels that require a catalyst, this is preferably in the form of a corrugated metal substrate carrying the catalyst in a ceramic coating, and such corrugated structures may be removable from the channels when the catalyst is spent. However, where there is a large pressure difference between the two fluids, this will tend to cause the plates to bend, so that synthesis gas may bypass the catalyst structure, and heat transfer between the catalyst structure and the plates is impeded, and it may be difficult to remove or replace the catalyst structure; yet if the plates are to be strong enough to resist the pressure difference, then the plates will have to be thicker and/or the channels narrower, and the total catalyst-bearing channel volume as a proportion of the total volume of the reactor will tend to be less.

According to the present invention there is provided a reactor for Fischer-Tropsch synthesis comprising a generally rectangular reactor block comprising a stack of plates defining a multiplicity of first and second flow channels arranged alternately in the block, for carrying first and second fluids respectively, the first fluid being a gas mixture which undergoes Fischer-Tropsch synthesis and whose pressure is above ambient pressure, and the second fluid being a coolant fluid; wherein the first flow channels extend in a generally vertical direction between upper and lower faces of the reactor block; and wherein the second flow channels extend in directions generally parallel to those of the first flow channels, and communicate through distributor chambers with inlet and outlet ports at one or more side faces of the reactor block; and wherein each first flow channel contains a removable gas-permeable catalyst structure incorporating a metal substrate.

Preferably each first flow channel is of width no more than 200 mm, measured in the plane parallel to the plate; more preferably the width is no more than 100 mm. Preferably the first flow channels are defined by plates and spaced supports. The spaced supports may be in the form of, for example, bars, fins or lands between grooves cut into a plate, or fins defined by a ridged or castellated plate.

The Fischer-Tropsch reaction is typically carried out at a temperature about 200° C. to 250° C., so a wide range of materials may be selected for the reactor module. For example the reactor module may be made of an aluminium alloy, stainless steel, high-nickel alloys, or other steel alloys.

Preferably the metal substrate for the catalyst structure is a steel alloy that forms an adherent surface coating of aluminium oxide when heated, for example an aluminium-bearing ferritic steel such as iron with 15% chromium, 4% aluminium, and 0.3% yttrium (eg Fecralloy™). When this metal is heated in a gas containing oxygen (e.g. air) it forms an adherent oxide coating of alumina, which protects the alloy against further oxidation and against corrosion. When coated with a ceramic coating of alumina to provide a catalyst support, this appears to bond to the oxide coating on the surface. The substrate may be a wire mesh or a felt sheet, but the preferred substrate is a thin metal foil for example of thickness less than 100 μm, and the substrate may be corrugated or pleated, and may be dimpled, and may be perforated. Such a catalyst structure incorporating catalytic material may be inserted into each of the first flow channels. The metal substrate of the catalyst structure provides mechanical strength, and enhances heat transfer and catalyst surface area. The catalyst structures are removable from the channels in the module, so they can be replaced if the catalyst becomes spent. The first flow channels, and consequently also the catalyst structures, are preferably of width in the plane parallel to the plate between 4 mm and 100 mm, and preferably extend by at least 8 mm in one dimension transverse to the flow direction. For good heat transfer the first flow channels are preferably no more than 15 mm deep and more preferably no more than 10 mm deep in the direction perpendicular to the plate.

The stack of plates forming the reactor block is bonded together for example by diffusion bonding, brazing, or hot isostatic pressing.

Preferably the gas mixture is supplied so as to flow in a downward direction through the first flow channels. In a preferred embodiment the gas mixture is supplied through a supply means such as a header to the entire face of the reactor block, and the first flow channels are open (within the supply means) along the upper face of the reactor block. This ensures that removal and replacement of the catalyst inserts is straightforward, once the supply means has been removed from the reactor block. Furthermore, headers are preferably provided at the lower face of the reactor block for outflow of the fluids that have undergone Fischer-Tropsch synthesis, and headers are preferably provided for coolant, communicating with the inlet and outlet ports on one or more side faces of the reactor block. It is also desirable that the flow of gas should be substantially uniform across all the first flow channels, so the space velocity is the same in each Fischer-Tropsch channel.

Arranging the coolant to flow in a direction generally parallel to the flow in the first flow channels makes it easier to minimise temperature variation within the coolant between opposite sides of the reactor block. The coolant flow may be co-current or counter-current relative to the flow in the first flow channels.

The coolant channels (i.e. the second flow channels) are defined between adjacent plates in the stack, and the plates may be spaced apart by ridged sheets to define parallel flow channels. The ridged sheets may for example have corrugations that are zigzag, curved, or castellated. Preferably the ridged sheets do not extend to the ends of the plates, and the spaces between the end portions of the plates define the distributor chambers. Thus the coolant enters a distributor chamber flowing in a generally horizontal direction, then flows vertically down the flow channels, and then returns to a generally horizontal flow direction to emerge from the distributor chamber at the other end. Within these distributor chambers there may be means such as baffles or fins to enhance the uniformity of distribution of coolant as it is directed from the horizontal plane to the vertical plane and back to the horizontal plane.

As indicated above such a Fischer-Tropsch reactor may form part of a plant for making longer chain hydrocarbons, the plant incorporating means for forming synthesis gas, and means for performing Fischer-Tropsch synthesis on the synthesis gas to generate longer-chain hydrocarbons. The synthesis gas may be made from natural gas. This process can be carried out at an oil-producing facility connected to one or more oil wells, for example to treat associated gas. However the flow rate of associated gas can be expected to vary significantly through the operating life of the oil-producing facility, and it is therefore desirable to be able to accommodate changes or fluctuations in the flow rate of associated gas. This may be achieved by using a plant that incorporates a multiplicity of Fischer-Tropsch reactors as specified above, through which the flows of synthesis gas are in parallel, so that variations in the gas flow rate can be accommodated by varying the number of reactors that are in use. Hence the reaction conditions such as space velocity in the means for performing Fischer-Tropsch synthesis can be held within a comparatively narrow range despite much larger changes in the flow rate of associated gas. Preferably a multiplicity of the Fischer-Tropsch reactors are substantially equivalent in throughput, nominal product conversion, and in their external connections, so as to be interchangeable and readily replaceable. Indeed they are preferably identical reactors. This interchangeability means that if one reactor needs to be serviced, either on a scheduled basis or to rectify a fault, the reactor can be readily removed and replaced. Preferably the subsequent servicing would be carried out at a different location, so that there is no need to provide catalyst handling facilities at the oil-producing facility.

Particularly in this context it is desirable that each Fischer-Tropsch reactor should be readily taken out of use, and readily disconnected from the plant, and equally readily replaced and brought back into use.

The invention will now be further and more particularly described, by way of example only, and with reference to the accompanying drawings, in which:

FIG. 2 shows a sectional view of a reactor module incorporating the reactor block of FIG. 1a;

FIG. 3 shows a flow diagram of part of a process plant incorporating Fischer-Tropsch reactor modules of the invention.

The invention is of relevance to a chemical process for converting natural gas (primarily methane) to longer chain hydrocarbons. The first stage of this process is to produce synthesis gas, and preferably involves steam reforming, that is to say the reaction:

$$H_2O+CH_4 \rightarrow CO+3H_2$$

This reaction is endothermic, and may be catalysed by a rhodium or platinum/rhodium catalyst in a first gas flow channel. The heat required to cause this reaction may be provided by combustion of a fuel gas such as methane, or another short-chain hydrocarbon (e.g. ethane, propane, butane), carbon monoxide, hydrogen, or a mixture of such gases, which is exothermic and may be catalysed by a palladium/platinum catalyst in an adjacent second gas flow channel. Alternatively the synthesis gas may be produced by a partial oxidation process or an autothermal process, which are well-known processes; these produce synthesis gases of slightly different compositions.

The synthesis gas mixture is then used to perform a Fischer-Tropsch synthesis to generate longer chain hydrocarbons, that is to say:

$$n CO+2n H_2 \rightarrow (CH_2)_n+n H_2O$$

which is an exothermic reaction, occurring at an elevated temperature, typically between 190° C. and 280° C., and an elevated pressure typically between 1.8 MPa and 2.8 MPa (absolute values), in the presence of a catalyst such as iron, cobalt or fused magnetite. The preferred catalyst for the Fischer-Tropsch synthesis comprises a coating of gamma-alumina of specific surface area 140-230 $m^2/g$ with about 10-40% cobalt (by weight compared to the alumina), and with a promoter such as ruthenium, platinum or gadolinium which is less than 10% the weight of the cobalt, and a basicity promoter such as lanthanum oxide. The preferred reaction conditions are at a temperature of between 215° C. and 235° C., and a pressure in the range from 2.1 MPa up to 2.7 MPa, for example 2.6 MPa.

Figure 1A:
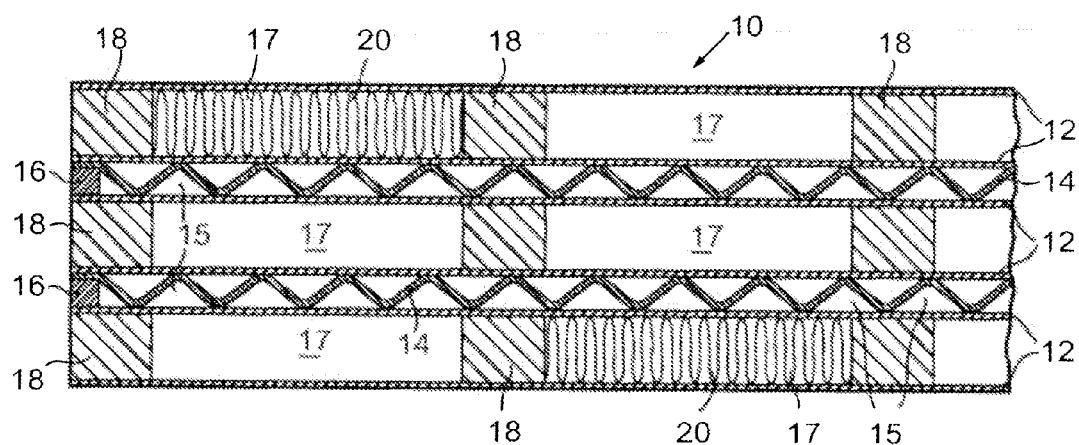
FIG. 1a shows a sectional view of part of a reactor block suitable for Fischer-Tropsch synthesis.

Referring now to FIG. 1a there is shown a reactor block 10 suitable for use in a Fischer-Tropsch reactor module 50 (see FIG. 2), the reactor block 10 being shown in section and only in part. The reactor block 10 consists of a stack of flat plates 12 of thickness 1 mm spaced apart so as to define channels 15 for a coolant fluid alternating with channels 17 for the Fischer-Tropsch synthesis. The coolant channels 15 are defined by sheets 14 of thickness 0.75 mm shaped into flat-topped sawtooth corrugations. The height of the corrugations (typically in the range 1 to 4 mm) is 2 mm in this example, and correspondingly thick solid edge strips 16 are provided along the sides, and the wavelength of the corrugations is 12 mm (the arrangement being described in more detail below). The channels 17 for the Fischer-Tropsch synthesis are of height 5 mm (typically within a range of 2 mm to 10 mm), being defined by bars 18 of square or rectangular cross-section, 5 mm high, spaced apart by 80 mm (the spacing typically being in a range of 20-100 mm) and so defining straight through channels. Within each of the channels 17 for Fischer-Tropsch synthesis is a corrugated 50 µm thick foil 20 (typically of thickness in the range from 20-150 µm) with a ceramic coating acting as a support for the catalytic material (only two such foils 20 are shown). The reactor block 10 may be made by stacking the components that define the channels 15 and 17, and then bonding them together for example by brazing or by diffusion bonding. The reactor block 10 is then turned through 90° so that the channels 15 and 17 are upright, and the catalyst carrying foils 20 are inserted into the channels 17.

Figure 1B:
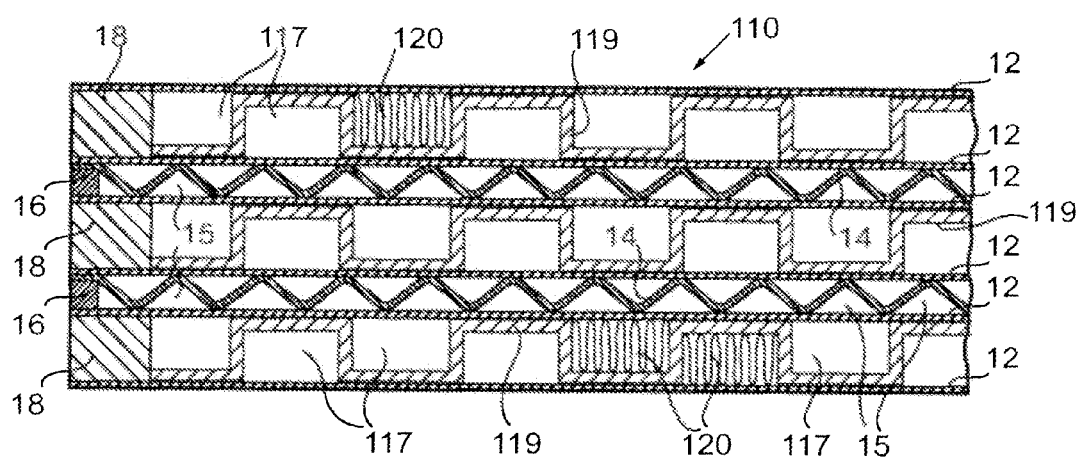
FIG. 1b shows a sectional view of part of an alternative reactor block suitable for Fischer-Tropsch synthesis.

Referring now to FIG. 1b there is shown an alternative reactor block 110 suitable for use in a Fischer-Tropsch reactor module, the reactor block 110 being shown in section and only in part. In many respects the reactor block 110 resembles the reactor block 10, identical components being referred to by the same reference numerals. The reactor block 110 consists of a stack of flat plates 12 of thickness 1 mm spaced apart so as to define channels 15 for a coolant fluid alternating with channels 117 for the Fischer-Tropsch synthesis. The coolant channels 15 are defined in addition by sheets 14 of thickness 0.75 mm shaped into flat-topped sawtooth corrugations as described above, with solid edge strips 16. The channels 117 for the Fischer-Tropsch synthesis are sealed by solid edge bars 18 and are defined in addition by sheets 119 of thickness 1.0 mm shaped into castellations of height in the range of 4 mm to 12 mm, preferably 5 mm. In the preferred example the resulting channels 117 are of width 10 mm and of height 5 mm and extend straight through the stack from one face to the opposite face. As with the channels 15, 17 within the reactor block 10, the channels 15 and 117 in reactor block 110 extend in parallel. Within each of the channels 117 for Fischer-Tropsch synthesis is a corrugated thin foil 120 of thickness in the range from 20-150 µm, preferably 50 µm, with a ceramic coating acting as a support for the catalytic material (only three such foils 120 are shown). The reactor block 110 may be made by stacking the components that define the channels 15 and 117, and then bonding them together for example by brazing. The reactor block 110 is then turned through 90° so that the channels 15 and 117 are upright, and the catalyst carrying foils 120 are inserted into the channels 117.

In both the reactor blocks 10 and 110 the catalyst inserts 20 or 120 are shown as single corrugated foils of the height of the channel 17 or 117, but might instead consist of a stack of corrugated foils and substantially flat foils. In the reactor block 110 shown in FIG. 1b the channels 117 have their largest transverse dimension parallel to the plane of the plates 12. In an alternative arrangement, not illustrated, the channels may have their largest transverse dimension perpendicular to the plane of the plates 12. In either case the width of the channels is preferably between about 4 and 20 mm. Each plate 12 may for example be 1.3 m by 1.3 m, or 1.2 m by 0.8 m, so the channels 17 or 117 would be 1.3 m long or 0.8 m long, respectively. Preferably the channels 17 or 117 are no more than 1.5 m long, and preferably at least 0.3 m long.

Figure 2:
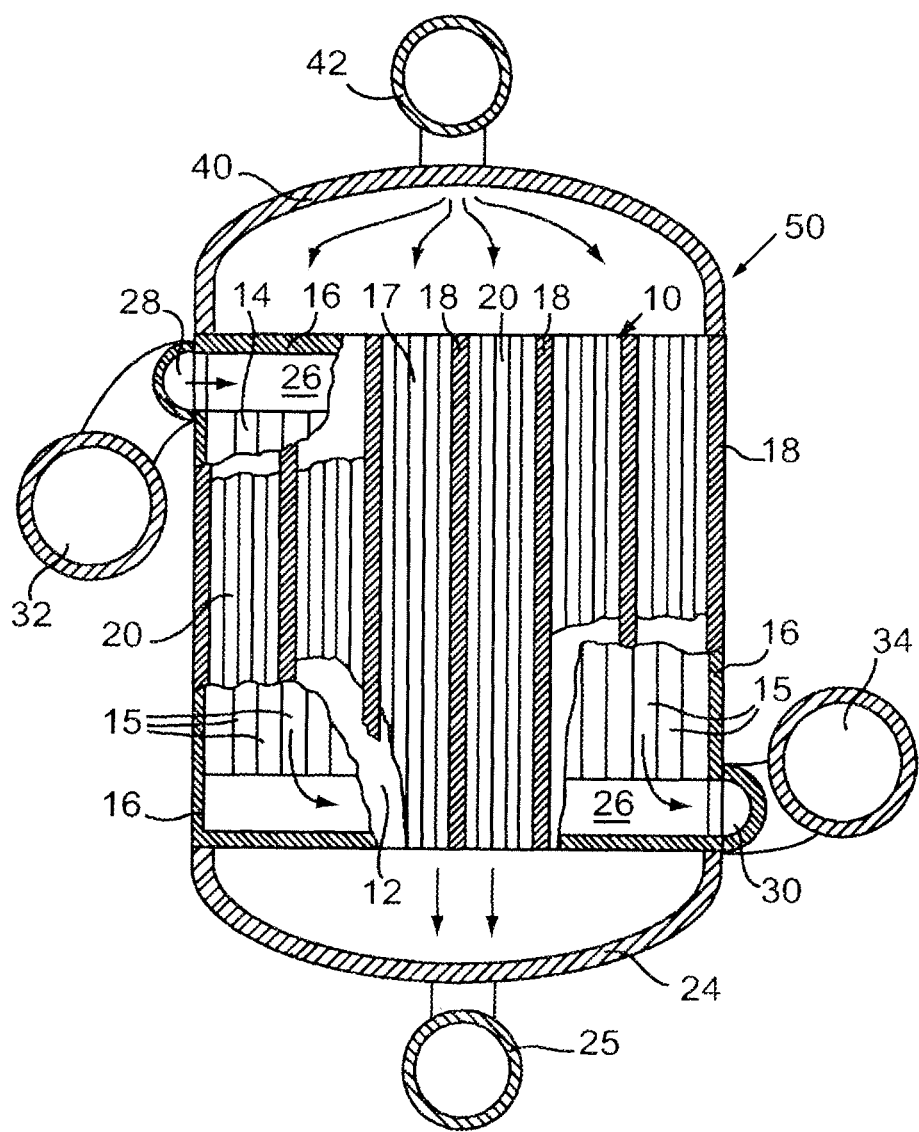

Referring now to FIG. 2, the reactor module 50 incorporating the reactor block 10 is shown in vertical cross-section, with the reactor block 10 partly broken away. As mentioned above, the reactor block 10 consists of a stack of flat plates 12 separated from each other to define the flow channels 15 and 17. The channels 17 for the Fischer-Tropsch reaction contain catalyst-carrying corrugated foils 20, and extend straight through the reactor block 10 (from top to bottom), the top face being open, and at the bottom face the channels 17 communicate with a header 24. The reaction products flow out of the header 24 through a duct 25. For the coolant channels 15 the flat plates 12 are held apart by the edge strips 16 around the perimeter of the plate 12, and in the central section also by the corrugated sheets 14. Beyond each end of each corrugated sheet 14 is an end portion 26, enclosed by the edge strips 16 apart from a gap on one side, so that the end portion 26 communicates with a respective header 28 or 30; these extend the length of the reactor block 10 and are attached to its sides near diametrically opposite corners, top left and bottom right as shown. The coolant fluid is supplied to the header 28 and withdrawn through the header 30, and the end portions 26 distribute the coolant between the header 28 or 30 and the coolant channels 15. The coolant is supplied to the header 28 from a duct 32, and is removed from the header 30 by a duct 34, so the flow is generally co-current relative to the flow in the Fischer-Tropsch channels 17. The flat plates 12, the edge strips 16, the bars 18, and the corrugated sheets 14 may be of aluminium alloy, for example 3003 grade (aluminium with about 1.2% manganese and 0.1% copper).

The synthesis gas is supplied to the top face of the reactor block 10 through a header 40, although it will be appreciated that other supply means may be used with the reactor block 10. Synthesis gas is supplied to the header 40 through a pipe 42.

In use of the reactor module 50 the coolant may be supplied at such a flow rate that the coolant temperature increases by a preset amount such as 10 K on passing through the reactor 50; arranging for the coolant to flow co-current relative to the Fischer-Tropsch channels 17 (apart from the coolant flow in the distributing end portions 26) helps to minimise the temperature difference across any two points in any horizontal plane through the cooling channels of the reactor block 10.

By way of example the reactor block 10 might be of overall length over 1 m, say 8 m, and its cross-sectional area is that of one of the plates 12. The reactor module 50 incorporating the reactor block 10 may weigh no more than 25 tonnes, so it can be handled by conventional cargo handling equipment. It may have sufficient capacity to produce about 32 $m^3$/day (200 barrels/day) of long chain hydrocarbons.

The Fischer-Tropsch reactor module 50 may form part of a plant for processing natural gas to obtain longer chain hydrocarbons, the plant incorporating means for forming synthesis gas from methane, and means for subjecting the synthesis gas to Fischer-Tropsch synthsis to generate longer-chain hydrocarbons. This process can be carried out at an oil well, for example to treat associated gas. However the flow rate of associated gas can be expected to vary significantly through the operating life of the oil well, and it is therefore desirable to be able to accommodate changes or fluctuations in the flow rate of associated gas. This may be achieved by using a plant as shown in FIG. 3, to which reference is now made, with a multiplicity of identical Fischer-Tropsch reactor modules 50 as described above (only four are shown), each comprising a reactor block 10, through which the flows of synthesis gas are in parallel, so that variations in the gas flow rate can be accommodated by varying the number of reactor modules 50 that are in use. Hence the Fischer-Tropsch synthesis reaction conditions such as space velocity can be held within a comparatively narrow range despite much larger changes in the flow rate of associated gas. For example if the plant is required to produce 150 $m^3$/day of longer chain hydrocarbons then the plant may utilise five identical reactor modules 50 each of the dimensions indicated above, so that each reactor module 50 has the capacity 32 $m^3$/day.

Synthesis gas at a suitable pressure (say 2.6 MPa) is provided through a feed duct 60, through which it is supplied to the inlet pipe 42 of each reactor module 50. Coolant fluid is circulated through the coolant channels and recirculated via a temperature control system 44 (represented diagrammatically), ensuring that the temperature difference between the inlet 32 and outlet 34 for the coolant is no more than say 10 K, and that the average temperature of the reactor 50 remains constant. Although each reactor module 50 is shown as being provided with its own temperature control system 44, in practice a single temperature control system would usually be provided for all the modules 50, or for groups of modules 50; but if reactor modules 50 are to be changed out individually then each module 50 may include dedicated controls to accommodate for the variation in activity between fresh and aged catalyst.

It is known that the performance of a Fischer-Tropsch reactor (for example the percentage conversion of CO) depends upon the reaction temperature. However in a reactor such as that described above it has been found that a temperature difference of up to 10 K along the reactor channels does not have a significant effect: the performance of the reactor is determined by the mean temperature. Hence the temperature control system 44 includes a control circuit to ensure that the mean coolant temperature has the value so as to achieve a predetermined conversion, and the mean temperature should not differ by more than 2 K from this set point value, preferably not differing by more than 1 K. This control is achieved by controlling the temperature of the coolant supplied to the reactor module 50, and fine adjustment of the mean temperature is obtained by adjusting the flow rate, since the temperature difference between inlet and outlet on the process side is directly related to the corresponding temperature difference on the coolant side. At the same time the coolant flow rate is also controlled to ensure that the temperature difference between the inflowing and outflowing coolant does not exceed a preset limit; this limit may be 10 K or less, for example 7 K or 5 K.

The fluid mixture containing reaction products emerges through the ducts 25 from the Fischer-Tropsch reactor modules 50, and is cooled by passage through a heat exchanger 46 to condense water vapour and longer chain hydrocarbons. This is then separated by a separator 48 into water, liquid hydrocarbons C5+, and remaining tail gases 64. The coolant used for the heat exchanger 46 may be water, and may be at ambient temperature, say about 20 or 30° C., or preferably somewhat warmer, say between 60 and 80° C. to ensure no waxing of the heat exchanger surfaces.

The combination of the reactor modules 50, the heat exchanger 46 and the separator 48 may be referred to as a synthesis assembly 66. In some cases the tail gas 64 from the separator 48 is then fed through a second synthesis assembly 66 to convert remaining hydrogen and carbon monoxide to additional longer chain hydrocarbons C5+. In general the plant may consist of a plurality of such synthesis assemblies 66, so as to carry out Fischer-Tropsch synthesis in a plurality of stages. The number of stages depends on the proportion of the synthesis gas that undergoes Fischer-Tropsch synthesis in each stage.

Each module 50 in this plant is provided with shut-off valves 55 or pairs of shut-off valves 55 so the flows of synthesis gas in and out can be turned off to that individual reactor module 50 without preventing operation of the remainder of the plant. Valves 56 also enable the coolant to be turned off. Hence if the flow rate of associated gas changes, the capacity of the plant to perform Fischer-Tropsch synthesis can be adjusted accordingly by changing the number of reactor modules 50 in use. When it is necessary to shut off one of the Fischer-Tropsch reactor modules 50, the shut-off valves 55 are both closed, but at the same time the reactor module 50 is flushed through with a shutdown gas at the Fischer-Tropsch channel operating pressure (2.6 MPa in this example) from a shutdown gas supply 58, to remove any remaining synthesis gas. The shutdown gas supply 58 is connected via shut-off valves 59 (which are normally closed) to each reactor module 50, but only the connections to one reactor module 50 are shown. After flushing out the synthesis gas, the reactor module 50 is then closed in at this operating pressure by also closing the shut-off valves 59. This ensures that the catalyst does not deteriorate. The shutdown gas is a gas that is not involved in the catalytic reaction, thereby substantially preventing further catalytic activity in the reactor. Examples of suitable gases include pure methane, desulphurised natural gas, and nitrogen.

This procedure also enables individual reactor modules 50 to be removed and replaced, while not in use, for example if a reactor module 50 needs to be refurbished for example to replace spent catalysts. It will be appreciated that such a reactor module 50 that has been removed from the plant, and has been subsequently depressurised, can readily be dismantled by disconnecting the header 40 from the reactor block 10. The catalyst carrying foils 20 can then be withdrawn through the open ends of the channels 17.

It will be appreciated that the reactor block 10 and the reactor module 50 described above are by way of example only, and that they may be modified in many ways while remaining within the scope of the present invention. For example the plates may be of a different shape and size, and the flow channels 15 and 17 (or 117) may have a different cross-sectional shape to those described above, for example the corrugated sheet 14 might have castellated corrugations. The catalyst structure is shown as a single corrugated foil 20 or 120, but it may instead for example be an assembly of two corrugated foils with a flat foil between them or three corrugated foils with two flats between them. Furthermore the catalyst structure may extend the entire length of the channel 17 or 117, or may for example extend only along that part of the channel that is adjacent to a coolant channel 15.

With a reactor block 10 that is more than about 1 m long it may be preferable, in place of the single header 24, to provide either a series of headers 24 along the length of the block 10, or to connect the duct 25 to the header 24 at several positions along the length of the block 10. These options also apply to the synthesis gas header 40, the coolant inflow header 28 and the coolant outflow header 30. And instead of providing one coolant inflow header 28 and one coolant outflow header 30 diagonally opposite each other, there might instead be two coolant inflow headers 28, one on each side next to the top of the reactor block 10, and two coolant outflow headers 30, one on each side next to the bottom of the reactor block 10.

The invention claimed is:

1. A reactor module for Fischer-Tropsch synthesis comprising a generally rectangular reactor block comprising a stack of plates defining a multiplicity of first and second flow channels arranged alternately in the block, for carrying first and second fluids respectively, the first fluid being a gas mixture which undergoes Fischer-Tropsch synthesis, and the second fluid being a coolant fluid; wherein the first flow channels extend in a generally vertical direction between upper and lower faces of the reactor block, there being multiple side-by-side first flow channels between successive plates in the block; and wherein the second flow channels extend in directions generally parallel to those of the first flow channels in a generally vertical direction, and communicate through horizontally-extending distributor chambers with inlet and outlet ports at one or more side faces of the reactor block, so the distributor chambers extend in a direction orthogonal to the direction of the first flow channels; the second flow channels are defined between successive flat plates that are spaced apart by edge strips and by corrugated sheets; and wherein each first flow channel contains a removable gas-permeable catalyst structure incorporating a metal substrate.

2. A reactor module as claimed in claim 1 wherein the gas mixture is supplied so as to flow in a downward direction through the first flow channels.

3. A reactor module as claimed in claim 1 wherein each of the first flow channels has a width no more than about 200 mm, measured in the plane parallel to the plate.

4. A reactor module as claimed in claim 3 wherein the first flow channels are defined by plates and spaced supports.

5. A reactor module as claimed claim 1 wherein the first flow channels are defined by flat plates and ridged plates.

6. A reactor module as claimed in claim 5 wherein the ridged plates define castellations.

7. A reactor module as claimed in claim 3 wherein the width is no more than 100 mm.

8. A plant for processing natural gas to obtain longer chain hydrocarbons, the plant comprising a multiplicity of Fischer-Tropsch reactor modules as claimed in any one of the preceding claims, through which the flows of synthesis gas are in parallel, so that variations in the natural gas flow rate can be accommodated by varying the number of reactor modules that are in use.

9. A plant as claimed in claim 8 wherein each reactor module is connected via shut-off valves to a supply of shutdown gas.

10. A plant as claimed in claim 8 wherein at least three of the Fischer-Tropsch reactor modules are substantially equivalent in throughput, nominal product conversion, and in the external connections, so as to be interchangeable and readily replaceable.

11. A plant as claimed in claim 8, the plant further comprising coolant temperature control means that include means to control at least one of: the temperature of the coolant supplied to the reactor module; and the flow rate of coolant supplied to the reactor module.

12. A process for performing Fischer-Tropsch synthesis using plant as claimed in claim 11 wherein the flow rate of coolant is controlled such that the increase of temperature of the coolant on passing through the reactor module is no more than 10 K.

13. A process as claimed in claim 12 wherein reaction products emerging from the Fischer-Tropsch reactor modules are passed through a heat exchanger to exchange heat with a coolant at an initial temperature in the range between 20° C. and 90° C.

14. A process as claimed in claim 13 wherein the initial temperature is between 50° C. and 80° C.

15. A plant for processing natural gas to obtain longer chain hydrocarbons, the plant comprising a multiplicity of Fischer-Tropsch reactor modules for Fischer-Tropsch synthesis, each Fischer-Tropsch reactor module comprising a generally rectangular reactor block comprising a stack of plates defining a multiplicity of first and second flow channels arranged alternately in the block, for carrying first and second fluids respectively; wherein the first flow channels extend directly between upper and lower faces of the reactor block; and wherein the second flow channels extend in directions generally parallel to those of the first flow channels, and communicate through distributor chambers with inlet and outlet ports at one or more side faces of the reactor block, the distributor chambers extending in a direction orthogonal to the direction of the first flow channels; the second flow channels being defined between successive flat plates by corrugated sheets and by edge strips; and wherein each first flow channel contains a removable and replaceable gas-permeable catalyst structure incorporating a metal substrate; wherein the plant comprises means to supply the first fluid to the first flow channels, so the flows of the first fluid through the Fischer-Tropsch reactor modules are in parallel, the first fluid being a gas mixture which undergoes Fischer-Tropsch synthesis; and means to supply a second fluid to the second flow channels, the second fluid being a coolant fluid; and wherein each Fischer-Tropsch reactor module is oriented such that the first flow channels extend in a vertical direction.

16. A plant as claimed in claim 15 wherein at least three of the Fischer-Tropsch reactor modules are substantially equivalent in throughput, nominal product conversion, and in the external connections, so as to be interchangeable and readily replaceable.

17. A plant as claimed in claim 15, the plant further comprising coolant temperature control means that include means to control at least one of: the temperature of the coolant supplied to each reactor module; and the flow rate of coolant supplied to each reactor module.

* * * * *